(12) United States Patent
Blaum et al.

(10) Patent No.: US 7,484,137 B2
(45) Date of Patent: Jan. 27, 2009

(54) RAID SYSTEM USING REGIONAL ERROR STATISTICS FOR REDUNDANCY GROUPING

(75) Inventors: Mario Blaum, San Jose, CA (US); Roger Hoyt, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 458 days.

(21) Appl. No.: 11/096,638

(22) Filed: Mar. 31, 2005

(65) Prior Publication Data

US 2006/0224914 A1    Oct. 5, 2006

(51) Int. Cl.
*H03M 13/00*    (2006.01)
*G06F 11/00*    (2006.01)

(52) U.S. Cl. .................. 714/708; 714/704; 714/770; 714/774

(58) Field of Classification Search .................. 714/704, 714/708, 770, 774
See application file for complete search history.

(56) References Cited

U.S. PATENT DOCUMENTS

| | | | |
|---|---|---|---|
| 5,068,858 A * | 11/1991 | Blaum et al. ................. | 714/774 |
| 5,088,081 A * | 2/1992 | Farr ......................... | 369/47.14 |
| 6,223,252 B1 * | 4/2001 | Bandera et al. ............. | 711/114 |
| 6,862,152 B2 * | 3/2005 | Wu et al. ..................... | 360/65 |
| 7,133,966 B2 * | 11/2006 | Sato et al. .................... | 711/114 |
| 2005/0081087 A1 * | 4/2005 | Yagisawa et al. ............... | 714/5 |

OTHER PUBLICATIONS

David A. Patternson, Garth Gibson, and Randy H. Katz; "A Case for Redundant Arrays of Inexpensive Disks (RAID)", Computer Science Division, 1988, pp. 109-116.

* cited by examiner

*Primary Examiner*—Joseph D Torres
(74) *Attorney, Agent, or Firm*—John L. Rogitz

(57) ABSTRACT

Geometrically-dependent error rates are used to identify sectors for XORing data in a RAID system for parity purposes in such a way that the probability of failure of any particular group is minimized.

5 Claims, 2 Drawing Sheets

RAID SYSTEM USING REGIONAL ERROR STATISTICS FOR REDUNDANCY GROUPING

FIELD OF THE INVENTION

The present invention relates generally to Redundant Arrays of Inexpensive Disks (RAID).

BACKGROUND OF THE INVENTION

In Redundant Arrays of Inexpensive Disks (RAID) architectures, data from a number of disks is XORed to obtain a redundant disk. This way, if a disk suffers a failure, it can be reconstructed by XORing the surviving disks.

As an example, in so-called "RAID 4", to a plurality of information disks a redundancy disk is added that is the XOR of data on the information disks. Because in RAID 4 the redundant disk must be accessed to be updated each time data is written to any information disk, a bottleneck effect is created in the redundant disk. Such asymmetry of access is avoided in so-called "RAID 5" architectures, in which the redundancy is distributed among all disks. Thus, each disk has the same probability of being updated as any other disk, assuming a random, equally likely distribution of writes among all disks that are part of said RAID 5 architecture.

Regardless of the particular type of RAID, heretofore sectors in each disk have been XORed with geometrically corresponding sectors in the other disks. That means that data on the $m^{th}$ physical location (e.g., sector or track) of each of plural disks is XORed together for RAID purposes among all disks. This has been done because hard disk drives typically use zone recording, in which the number of sectors varies with the radius of track. For instance, regions of the disk near the outer diameter (OD) contain more sectors than regions near the medium diameter (MD), which in turn contain more sectors than regions near the inner diameter (ID).

As critically recognized herein, different disk regions can have differing error statistics. For example, a HDD may suffer from a problem at the OD (approximately, at 5% of its capacity), and repeated writes there may stress the data (magnetic or physical) in tracks that are near the one being written, essentially wiping out the data written in that adjacent track. The more writes, the more the probability of error, which may degrade linearly or worse with the number of writes. In any case, the probability of error in a region may be a combination of diverse factors, including the geometric location of the region and the number of writes to the region.

U.S. Pat. No. 5,068,858 discloses using different levels of error correction code (ECC) at the ID and at the OD to account for differing error statistics in the respective regions. The present invention understands that ECC-based solutions are appropriate for individual disks, but in a RAID architecture, another method to increase reliability is required. Accordingly, the present invention has been provided.

SUMMARY OF THE INVENTION

The present invention is a RAID system in which sectors that have high probability of error are not grouped together for redundancy writing purposes. The present invention thus uses regional error statistics for RAID writing purposes, regardless of how the error statistics are determined (e.g., within a single RAID system, across RAID systems of the same type, or across all disk drives) and regardless of the reasons for the error statistics (e.g., including variations in the head height over the disk, erasure of an adjacent track after repeated writes in the OD, increased number of dust particles in certain areas of the disk, etc.)

Accordingly, RAID-implemented software embodying logic is disclosed. The logic includes associating a first error statistic with a first geometric disk location, and associating a second error statistic with a second geometric disk location. A parity output is rendered by combining data on a first disk and stored in the first geometric disk location with data on a second disk and stored in the second geometric disk location to minimize the probability of failure of a data group based on the error statistics.

Also, a redundant region may be established if desired on a redundant disk for storing the parity output based on geometry-dependent error statistics. The redundant region can be in a different radial location than the first and second disk locations. In some implementations the error statistics are static, while in other implementations the error statistics are adaptively determined using, e.g., error correction code (ECC) information associated with the RAID.

In another aspect, a RAID controller executes logic to store data in plural storage disks. The logic includes receiving at least two error informations, such as two error statistics, that are respectively associated with two geometric disk regions and that indicate different error rates from each other. The logic also includes using the error informations to execute at least one RAID operation.

In still another aspect, a disk drive controller includes means for associating a first error statistic with a first disk region and a second error statistic with a second disk region. The controller also has means for combining data from a first region on a first disk with data from a second region on a second disk. Means are provided for identifying the first and second regions using the first and second error statistics.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
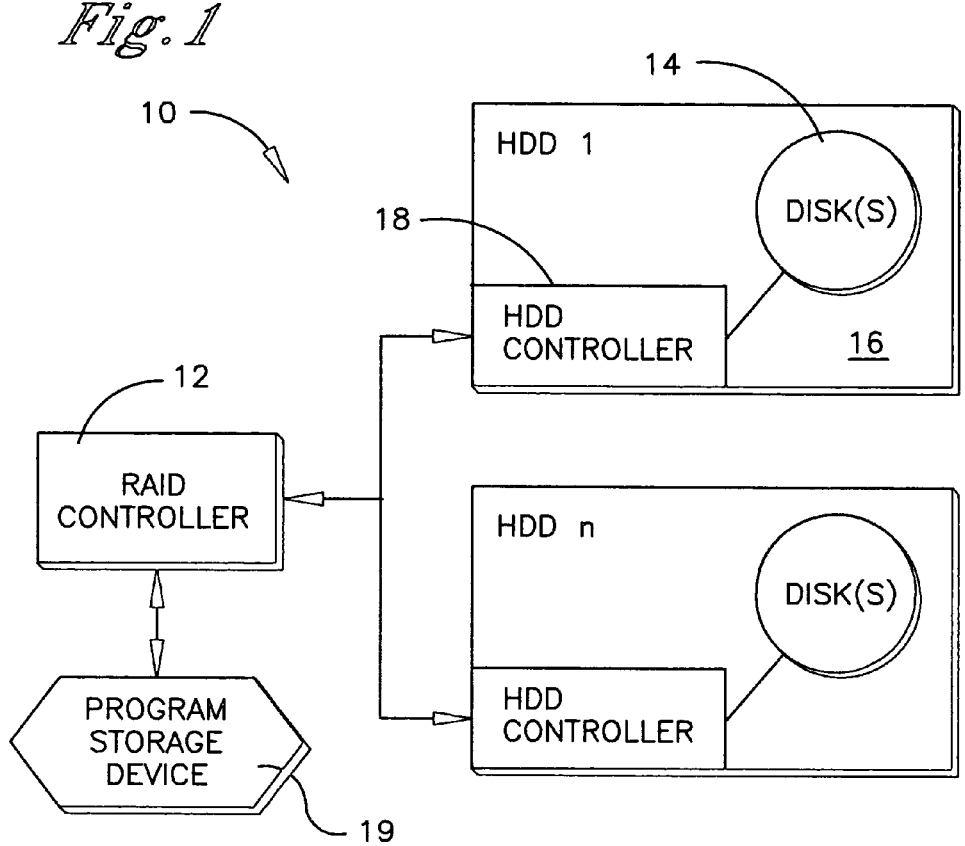
FIG. 1 is a schematic diagram of a RAID system.

Referring initially to FIG. 1, a RAID system is shown, generally designated 10, which includes at least one RAID controller 12 that may be implemented as a chip for controlling data storage on plural disks 14. Each disk 14 may be part of a respective hard disk drive 16 with associated HDD controller 18, which also may be implemented as a chip. The logic herein may be executed by the RAID controller 12 and/or one or more of the HDD controllers 18, using logic which may be embodied in firmware, hardware, or software stored on hardware such as a program storage device 19 that is accessible to the controller. The program storage device 19 may be disk storage, tape storage, solid state storage, and the like. The RAID system 10 may have any RAID architecture including RAID-1, RAID-4 in which all disks but one are data information storage disks and the remaining disk is a data redundancy disk, or RAID-5 in which all disks may function both as data information storage disks and as data redundancy disks.

Figure 2:
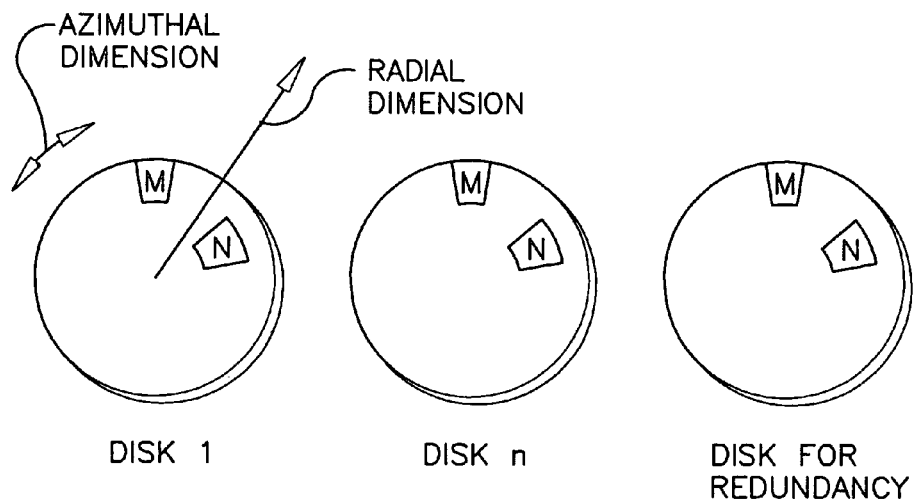
FIG. 2 is a schematic diagram of three disks in the RAID system, illustrating different geometric regions.

FIG. 2 illustrates that example regions "M" and "N" may exist on each disk in the system 10. The region "M" occupies the same geometric position or location on each disk as the region "M" occupies on other disks with respect to a common disk geometry reference system. Likewise, the region "N" occupies the same geometric position or location on each disk as the region "N" occupies on other disks. By "same geometric position or location" is meant "at least the same radial location" and can also mean "and also the same azimuthal location" relative to a common disk geometry reference. By "region" is meant zone, track, sector, bits, bytes, or any other digital data storage unit. The radial and azimuthal dimensions are shown in FIG. 2.

Figure 3:
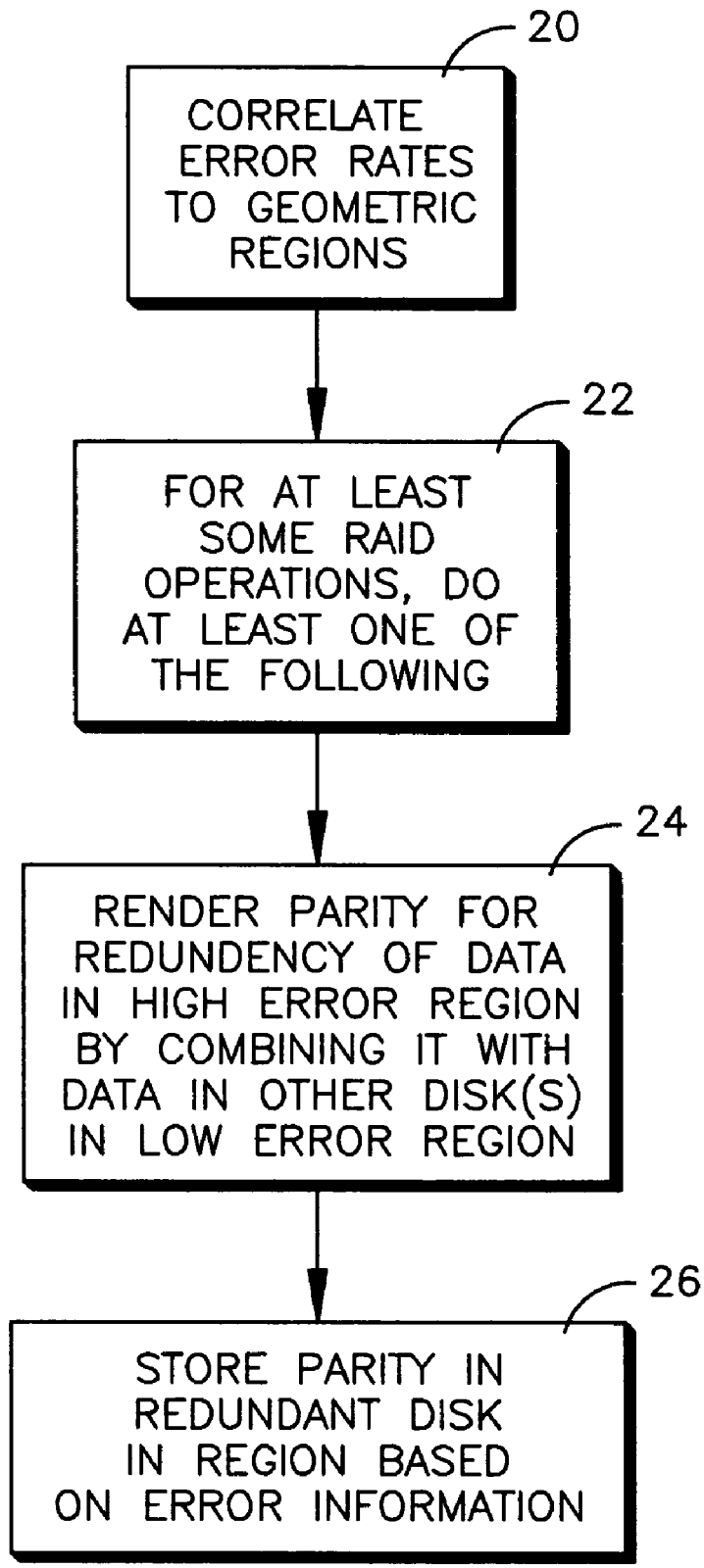
FIG. 3 is a flow chart of the present logic.

FIG. 3 shows the present logic. Commencing at block 20, error information such as error rate statistics are correlated to respective geometric regions of the disks. That is, recognizing that some regions are more likely to encounter errors than other regions, some or indeed all of the regions of the disks are associated with their respective error rates or other error information. This error information may be static, e.g., it may include general error statistics for different radial regions common to all HDDs, or it may include error statistics for HDDs of the same product number. Or, the error information can be adaptively determined by, e.g., the RAID controller 12 during operation, by observing error correction code (ECC) operation and/or ECC output on a region-by-region basis and accordingly adjusting the geometry-dependent error information. That is, the internal ECC of each disk may be used to measure degradation in sectors or tracks. If different sectors corresponding to the same XORed group start having degradation at the same time, the system may reallocate the sectors in such a way that no XORed group contains more than one degraded sector.

Proceeding to block 22, a DO loop is entered for RAID operations in which one or both of the actions at blocks 24 and 26 are executed. At block 24, to render a parity output for redundancy purposes, one or more regions having respective error statistics, which are on a first disk, are grouped with one or more regions having different error statistics which are on a second disk (or more) disks in such a way to minimize the probability of failure of the particular data group. The "grouping" act can take the form of XORing in accordance with RAID principles known in the art. In terms of FIG. 2, data in region "M" of a first disk is XORed with data in region "N" of another disk to render redundant data output, with the regions "M" and "N" having different error statistics owing to their different geometric locations relative to the common disk reference. In preferred implementations, data in regions of relatively high error rates is grouped with data on other disks in regions of relatively lower error rates.

Similarly, if desired not only can parity be rendered by XORing data in different geometric regions, but the parity itself can be stored on a redundant disk in a region that is also identified based on the error information associated with that region. For instance, parity that represents data from a region of high errors may be stored in a redundant disk region with low errors and vice-versa, owing to the geometry of the redundant disk region.

The following discussion illustrates the advantages of the present invention in providing better immunity from double failures. A non-limiting RAID architecture may include four disks, three of them carrying information and the fourth used for parity. As mentioned above, however, other RAID architectures such as a RAID 5 architecture can distribute the parity among all disks.

In any case, to simplify assume that the disks of the RAID system have only two geometry-dependent error probabilities, namely, $p_{ID}$ and $p_{OD}$, corresponding to the probabilities that a sector in the ID and in the OD, respectively, fails or otherwise experiences an error. The error probabilities may have already taken into account the ECC, which reduces the original probabilities of the unprotected disk. Regardless, were conventional RAID principles to be followed, each sector in each disk would be XORed with the geometrically corresponding sectors in the other disks. For a sector to fail, at least two sectors in the RAID must fail. Thus, a good approximation for the probability ($P_{ID}$) of sector failure in the ID is:

$$P_{ID} \approx \binom{4}{2}(p_{ID})^2(1-p_{ID}^2),$$

and similarly, for the OD, the probability $P_{OD}$ of sector failure is:

$$P_{OD} \approx \binom{4}{2}(p_{OD})^2(1-p_{OD}^2),$$

For example values of $10^{-8}$ for $p_{ID}$ and $10^{-5}$ for $p_{OD}$, $P_{ID}$ is about $6.10^{-16}$ and $P_{OD}$ is about $6.10^{-10}$, meaning that the bad case dominates.

Compare this with what results from the present logic. More particularly, the data groups from which parity is to be generated are mixed, e.g., three sectors near the ID of one disk may be XORed with one sector nearer the OD in another disk. A good approximation for the failure mode is to assume that one of the three ID sectors has failed together with the OD sector. The probability for this to occur is about $3p_{ID}p_{OD}(1-p_{ID})^2$. Assuming the above approximations for $p_{ID}$ and $p_{OD}$, the new probability P is about $3.10^{-13}$, which is a substantial improvement over the conventional error immunity. This is but one non-limiting example of how the present logic uses error statistics to reduce the probability of failure of a data group.

While the particular RAID SYSTEM USING REGIONAL ERROR STATISTICS FOR REDUNDANCY GROUPING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A computer-implemented method comprising:

associating at least a first error statistic with a first geometric disk location on a first disk;

associating at least a second error statistic with a second geometric disk location on a second disk, wherein the disks share a common disk geometry reference system, the first geometric disk location being a different radial and/or azimuthal location with respect to the common disk geometry reference system than the second geometric disk location; and rendering, based on the error statistics, at least one parity output by combining data on a first disk in the first geometric disk location with data on a second disk in the second geometric disk location to minimize the probability of failure of a data group.

2. The method of claim 1, comprising establishing a redundant region on a redundant disk for storing the parity output based at least in part on geometry-dependent error statistics.

3. The method of claim 2, wherein the redundant region is in a different radial location on the redundant disk than the first and second disk locations on the respective first and second disks.

4. The method of claim 1, wherein the error statistics are static.

5. The method of claim 1, wherein the error statistics are adaptively determined using error correction code (ECC) information associated with the RAID.

* * * * *